United States Patent
Sano

(10) Patent No.: US 8,283,917 B2
(45) Date of Patent: Oct. 9, 2012

(54) MULTI-ROTATION ANGLE DETECTION DEVICE

(75) Inventor: Tadashi Sano, Miyagi-Ken (JP)

(73) Assignee: Alps Electric Co., Ltd., Tokyo (JP)

( * ) Notice: Subject to any disclaimer, the term of this patent is extended or adjusted under 35 U.S.C. 154(b) by 330 days.

(21) Appl. No.: 12/780,427

(22) Filed: May 14, 2010

(65) Prior Publication Data
US 2010/0295541 A1 Nov. 25, 2010

(30) Foreign Application Priority Data
May 20, 2009 (JP) ................. 2009-122382

(51) Int. Cl.
*G01B 7/30* (2006.01)

(52) U.S. Cl. ............................... 324/207.25

(58) Field of Classification Search .................. None
See application file for complete search history.

(56) References Cited

U.S. PATENT DOCUMENTS

| | | | |
|---|---|---|---|
| 5,930,905 A | 8/1999 | Zabler et al. | |
| 6,720,762 B2 * | 4/2004 | Okumura | 324/207.21 |
| 7,285,952 B1 * | 10/2007 | Hatanaka et al. | 324/207.25 |

* cited by examiner

*Primary Examiner* — Minh N Tang
(74) *Attorney, Agent, or Firm* — Brinks Hofer Gilson & Lione

(57) ABSTRACT

A rotating axis of a first driven gear provided with a magnet and a rotating axis of a second driven gear provided with a magnet are orthogonalized with respect to a plane which includes a rotating axis of a rotor having a first gear and a second gear each with a different number of teeth concentrically provided for a flanged gear forming section.

2 Claims, 6 Drawing Sheets

| COMBINATIONS OF NUMBER OF TEETH (GEAR RATIO = 2) | | | |
|---|---|---|---|
| NUMBER OF TEETH OF FIRST GEAR 11 | NUMBER OF TEETH OF SECOND GEAR 12 | DIFFERENCE OF NUMBER OF TEETH | NUMBER OF TEETH OF FIRST DRIVEN GEAR 13 AND SECOND DRIVEN GEAR 14 |
| 72 | 63 | 9 | 36 |
| 64 | 56 | 8 | 32 |
| 56 | 49 | 7 | 28 |
| 48 | 42 | 6 | 24 |
| 40 | 35 | 5 | 20 |
| 32 | 28 | 4 | 16 |
| 24 | 21 | 3 | 12 |
| 16 | 14 | 2 | 8 |
| 8 | 7 | 1 | 4 | ations) No. 11-500828, for example.

MULTI-ROTATION ANGLE DETECTION DEVICE

CLAIM OF PRIORITY

This application claims benefit of the Japanese Patent Application No. 2009-122382 filed on May 20, 2009, which is hereby incorporated by reference.

BACKGROUND OF THE DISCLOSURE

1. Field of the Disclosure

The present disclosure relates to a multi-rotation angle detection device for detecting a rotating angle of a multi-rotation body which rotates in a limited angular range in excess of 360°, for example, a steering shaft for an automobile.

2. Description of the Related Art

Generally, the multi-rotation angle detection device of the aforementioned type includes a gear of a rotating body which rotates in association with a steering, two gears each having a different number of teeth in engagement with the gear of the rotating body, magnets respectively attached to the two gears, and angular sensors corresponding to those magnets. Based on measurement results of those angular sensors, a predetermined arithmetic expression is calculated to obtain the angle of the rotating body as disclosed in Japanese Unexamined Patent Application Publication (Translation of PCT Application) No. 11-500828, for example.

The generally employed rotating angle detection device is provided with the gear of the rotating body and two gears each having different number of teeth in engagement with the gear of the rotating body in a single plane, which may cause the problem of enlarged external dimension of the multi-rotation angle detection device.

SUMMARY

A multi-rotation angle detection device includes a rotor having a first gear and a second gear each with a different number of teeth, which are concentrically provided for a flanged gear forming section, a first driven gear which has a first rotating axis orthogonalized to a plane which includes a rotating axis of the rotor, and is engaged with the first gear, a second driven gear which has a second rotating axis orthogonalized to the plane, and is engaged with the second gear, a first magnet attached to the first driven gear, a second magnet attached to the second driven gear, a circuit substrate disposed at a position opposite a magnet mount surface of the first driven gear and a magnet mount surface of the second driven gear, a first magnetic detection element disposed at a position opposite the first magnet above the circuit substrate, a second magnetic detection element disposed at a position opposite the second magnet above the circuit substrate, and a housing which stores the aforementioned members.

DESCRIPTION OF THE PREFERRED EMBODIMENTS

A mechanical structure of the multi-rotation angle detection device according to the embodiment will be described by taking examples.

Example

Figure 1:
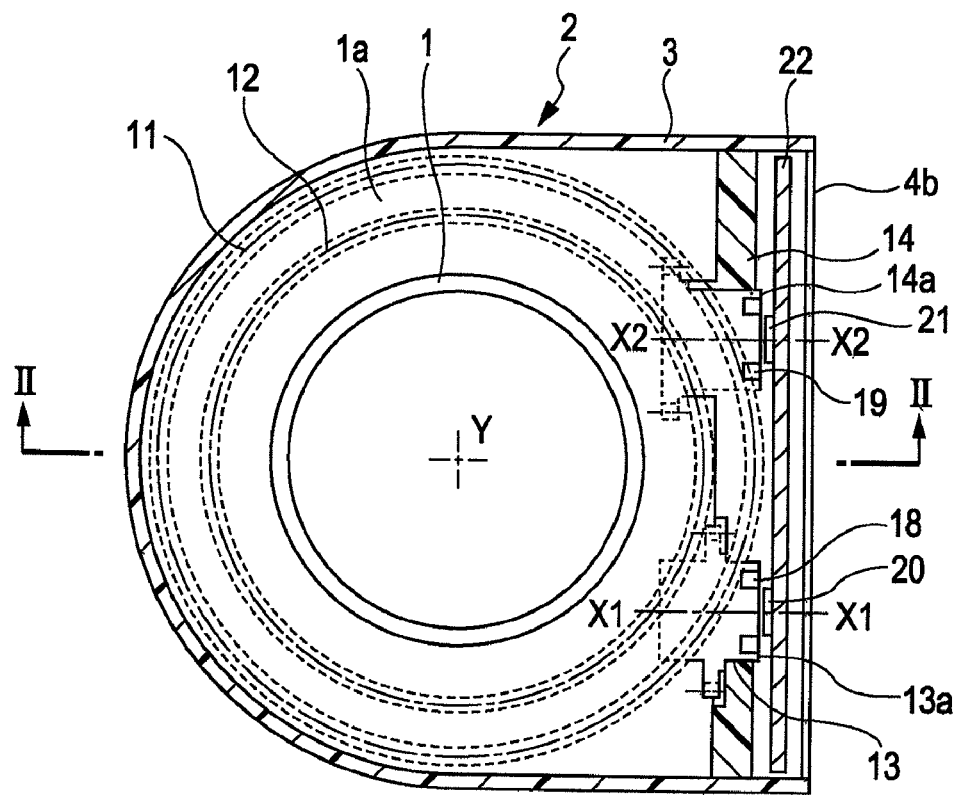
FIG. 1 is a plan view illustrating a multi-rotation angle detection device according to an example having a top cover removed.
Figure 2:
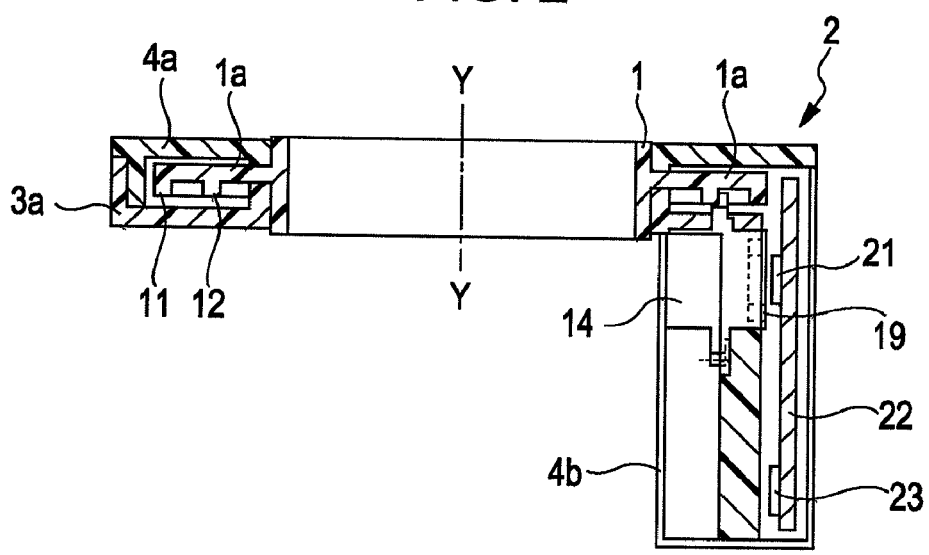
FIG. 2 is a sectional view taken along line II-II of FIG. 1.
Figures 3, 4:
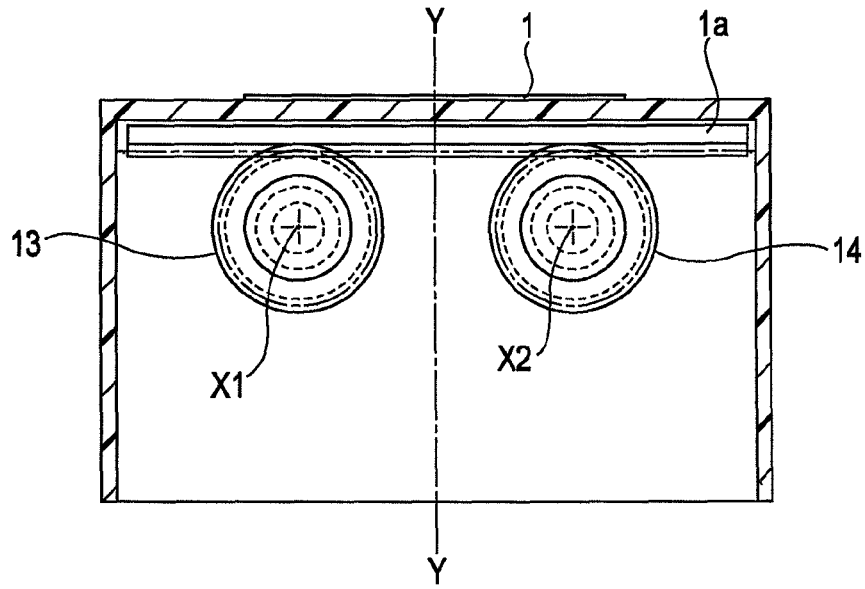
FIG. 3 is a side view of the multi-rotation angle detection device according to the example having a side cover removed.
FIG. 4 is a table representing combinations of number of teeth between the first gear and the first driven gear, and the second gear and the second driven gear which are available for the multi-rotation angle detection device according to the example.

Referring to FIGS. 1 to 3, a multi-rotation angle detection device according to the example has a first driven gear 13 and a second driven gear 14 disposed at the lower surface side of a flanged gear forming section 1a integrally formed with a rotor 1.

That is, the multi-rotation angle detection device according to the example includes a cylindrical rotor 1 attached to a rotating body such as a steering shaft so as to rotate together with the rotating body, and a housing (stator) 2 which is fixed to a not shown stator portion around the rotating body for rotatably holding the rotor 1. The housing 2 is formed by combining a case 3, a top cover 4a and a side cover 4b to form an L-like side view as shown in FIG. 2. Each of the rotor 1 and the housing 2 is formed of a synthetic resin material. Especially polyacetal is used for forming the rotor 1 for the purpose of providing smooth rotating operation and excellent sliding abrasion property. Upon production of the first driven gear 13 and the second driven gear 14 as described above, it is preferable to use the different material from the one for forming the rotor 1.

The flanged gear forming section 1a is integrally formed on the outer surface of the rotor 1. A first gear 11 and a second gear 12 each having different number of teeth are formed at the lower surface side of the gear forming section 1a concentrically with respect to the rotating axis of the rotating body, that is, the rotating axis Y-Y of the rotor 1. The first gear 11 which is formed at the outer circumference of the second gear 12, having the number of teeth larger than that of the second gear 12 is engaged with the first driven gear 13. The second gear 12 which is formed at the inner circumference of the first gear 11, having the number of teeth smaller than that of the first gear 11 is engaged with the second driven gear 14. Referring to FIGS. 1 and 2, the first driven gear 13 and the second driven gear 14 are rotatably held in the case 3.

The plane which includes the rotating axis Y-Y of the rotor 1 is arranged to be orthogonal to a rotating axis X1-X1 of the first driven gear 13. Likewise, the plane which includes the rotating axis Y-Y of the rotor 1 is arranged to be orthogonal to a rotating axis X2-X2 of the second driven gear 14. As a result, the rotating axis X1-X1 is positioned parallel to the rotating axis X2-X2. The gear for orthogonally crossed axis or orthogonally stagger axis may be employed for the first gear 11, the first driven gear 13 engaged therewith, the second gear 12, and the second driven gear 14 engaged therewith. As the gear for intersecting axis, a straight bevel gear or a spiral bevel type face gear may be employed. As the gear for orthogonal intersecting axis, a face gear may be employed. The appropriate gear is selected in accordance with the external configuration of the desired device.

The aforementioned structure allows the first driven gear 13 and the second driven gear 14 to be arranged such that a magnet mount surface 13a of the first driven gear 13 and a magnet mount surface 14a of the second driven gear 14 are aligned in the same plane. This makes it possible to form the side configuration of the housing 2 for storing the first and the second driven gears 13, 14 and the rotor 1 into substantially L-like shape, thus reducing the plane size of the multi-rotation angle detection device. A first magnet 18 is attached to the magnet mount surface 13a of the first driven gear 13, and a second magnet 19 is attached to the magnet mount surface 14a of the second driven gear 14, respectively. Each of those first and the second magnets 18, 19 is formed into a ring shape so as to be buried in the magnet mount surface 13a of the first driven gear 13 and the magnet mount surface 14a of the second driven gear 14, respectively.

A circuit substrate 22 is provided at a position opposite the magnet mount surface 13a of the first driven gear 13 and the magnet mount surface 14a of the second driven gear 14 in the housing 2. A first magnetic detection element 20 for detecting change in the magnetic field in association with the rotation of the first driven gear 13 is provided on the circuit substrate 22 at the position opposite the first magnet 18. A second magnetic detection element 21 for detecting change in the magnetic field in association with the rotation of the second driven gear 14 is provided at the position opposite the second magnet 19. A GMR (Giant Magneto-Resistive) sensor which is unlikely to be influenced by the change in the magnetic field intensity and exhibits high temperature stability may be employed for those magnetic detection elements 20 and 21. The circuit substrate 22 is also provided with a microprocessor 23 for calculating a rotating angle of the rotor 1 based on the detection signals from the first and the second magnetic detection elements 20, 21.

Assuming that the maximum rotating number of the rotor 1 is set to N (N: integer), and the gear ratio between the first gear 11 and the first driven gear 13 is set to n (n: integer), the number of teeth of the first gear 11 is obtained as being m times the value of N×n (m: integer). In the example, the absolute angle obtained while the rotor 1 is making two left and right rotations, respectively from the neutral position is intended to be detected (maximum rotating number N=4). In the case where the gear ratio between the first gear 11 and the first driven gear 13 is set to 2 (n=2), and the m is set to 8, 64 is obtained as the number of teeth by octuplicating the value of 4×2 (=8).

The number of teeth of the second gear 12 is obtained as being m times the value of N×n−1 (m: integer). In the example, 56 is obtained as the number of teeth by octuplicating the value of 4×2−1 (=7).

Combination of the numbers of teeth of the first gear 11 and the second gear 12 is not limited to the aforementioned example, and the values shown in FIG. 4 may be employed.

Assuming that the first gear 11 has the aforementioned structure, the number of teeth of the first driven gear 13 is obtained by multiplying N by the difference of the number of teeth between the first gear 11 and the second gear 12. In the example, N is set to 4, and the difference of the number of teeth is 8 (64−56). Therefore, the number of teeth of the first driven gear 13 becomes 32 (4×8).

Assuming that the second gear 12 has the aforementioned structure, the number of teeth of the second driven gear 14 is obtained likewise the case of the first driven gear 13. In the example, the number of teeth of the second driven gear 14 becomes 32.

The multi-rotation angle detection device of the embodiment has the first driven gear 13 and the second driven gear 14 disposed below the gear forming section 1a. Unlike the case for arranging the first and the second driven gears 13 and 14 on an outer circumference of the gear forming section 1a, the present structure may reduce the plane size L of the housing 2. As the magnet mount surface 13a of the first driven gear 13 and the magnet mount surface 14a of the second driven gear 14 are arranged in the same plane, both the first and the second magnetic detection elements 20, 21 may be mounted on the single circuit substrate 22, thus reducing the manufacturing cost of the multi-rotation angle detection device.

Modified Example

Figure 5:
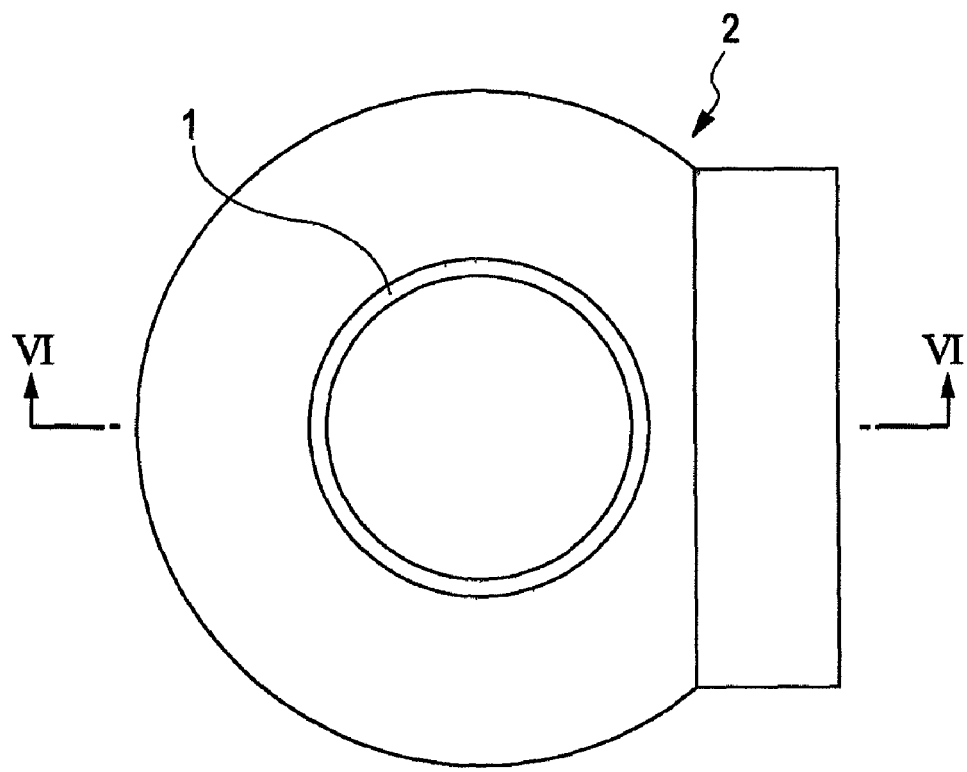
FIG. 5 is a plan view illustrating a multi-rotation angle detection device as a modified example.
Figure 6:
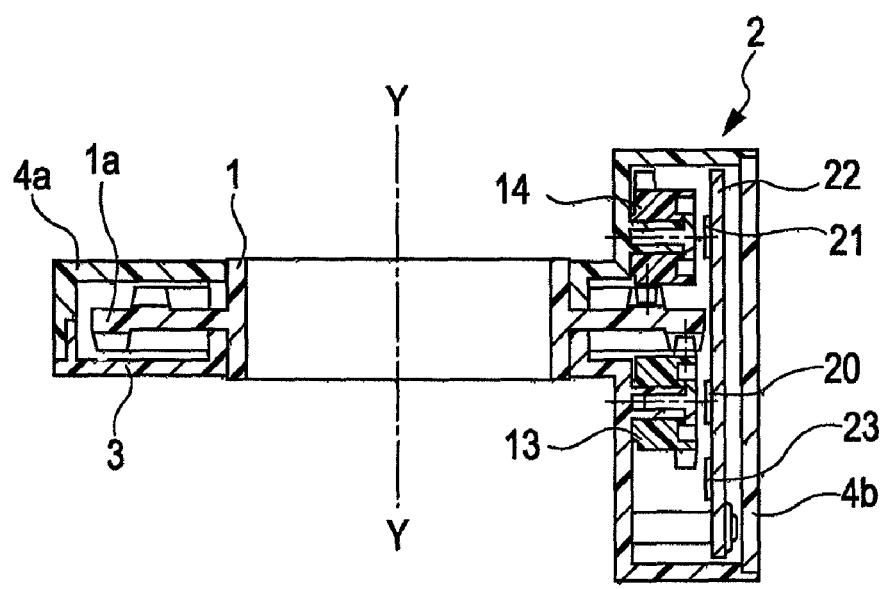
FIG. 6 is a sectional view taken along line VI-VI of FIG. 5.
Figure 7:
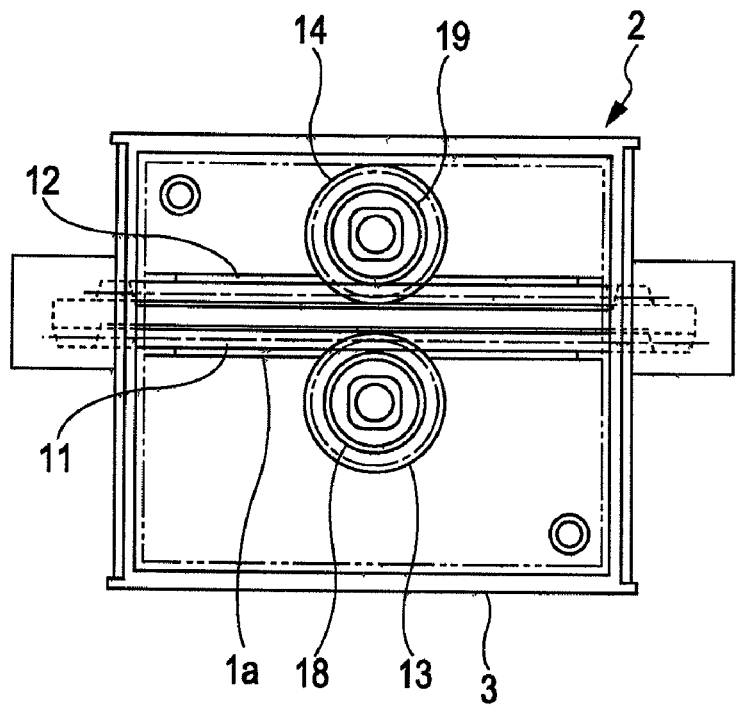
FIG. 7 is a side view of the multi-rotation angle detection device according to the modified example having a side cover removed.

The multi-rotation angle detection device according to a modified example includes the first driven gear 13 at the lower surface side of the flanged gear forming section 1a integrally formed with the rotor 1, and the second driven gear 14 at the upper surface side of the gear forming section 1a as shown in FIGS. 5 to 7. In the modified example, the first gear 11 is formed at the lower surface side of the gear forming section 1a, and the second gear 12 is formed at the upper surface side. The first driven gear 13 and the second driven gear 14 are disposed in the same radius of the gear forming section 1a, and the magnet mount surface 13a of the first driven gear 13 and the magnet mount surface 14a of the second driven gear 14 are arranged in the same plane. In this example, the housing 2 has substantially T-like side configuration as shown in FIG. 6. Other features of the modified example are the same as those of the multi-rotation angle detection device according to the example. The corresponding elements are designated with the same codes, and explanation thereof will be omitted.

Figure 8:
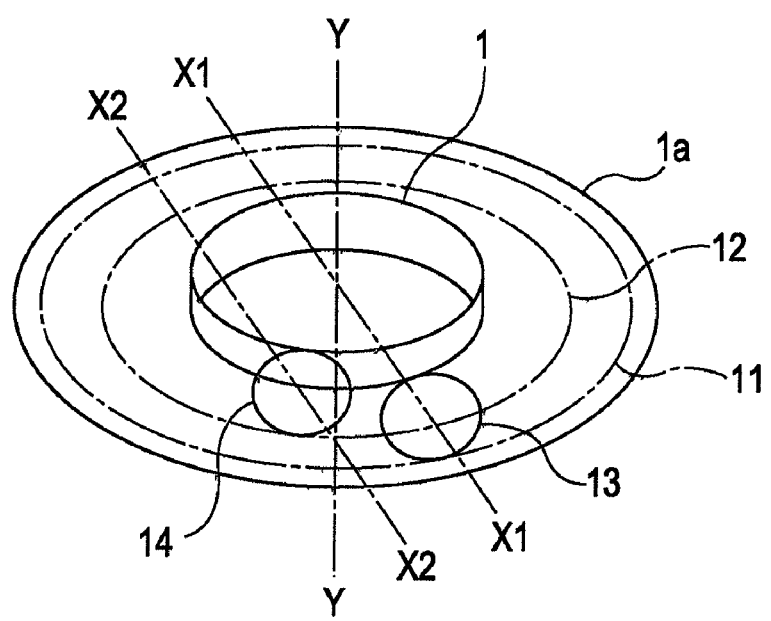
FIG. 8 is a perspective view illustrating an arrangement of the first and the second driven gears with respect to a rotor of the multi-rotation angle detection device according to another modified example.
Figure 9:
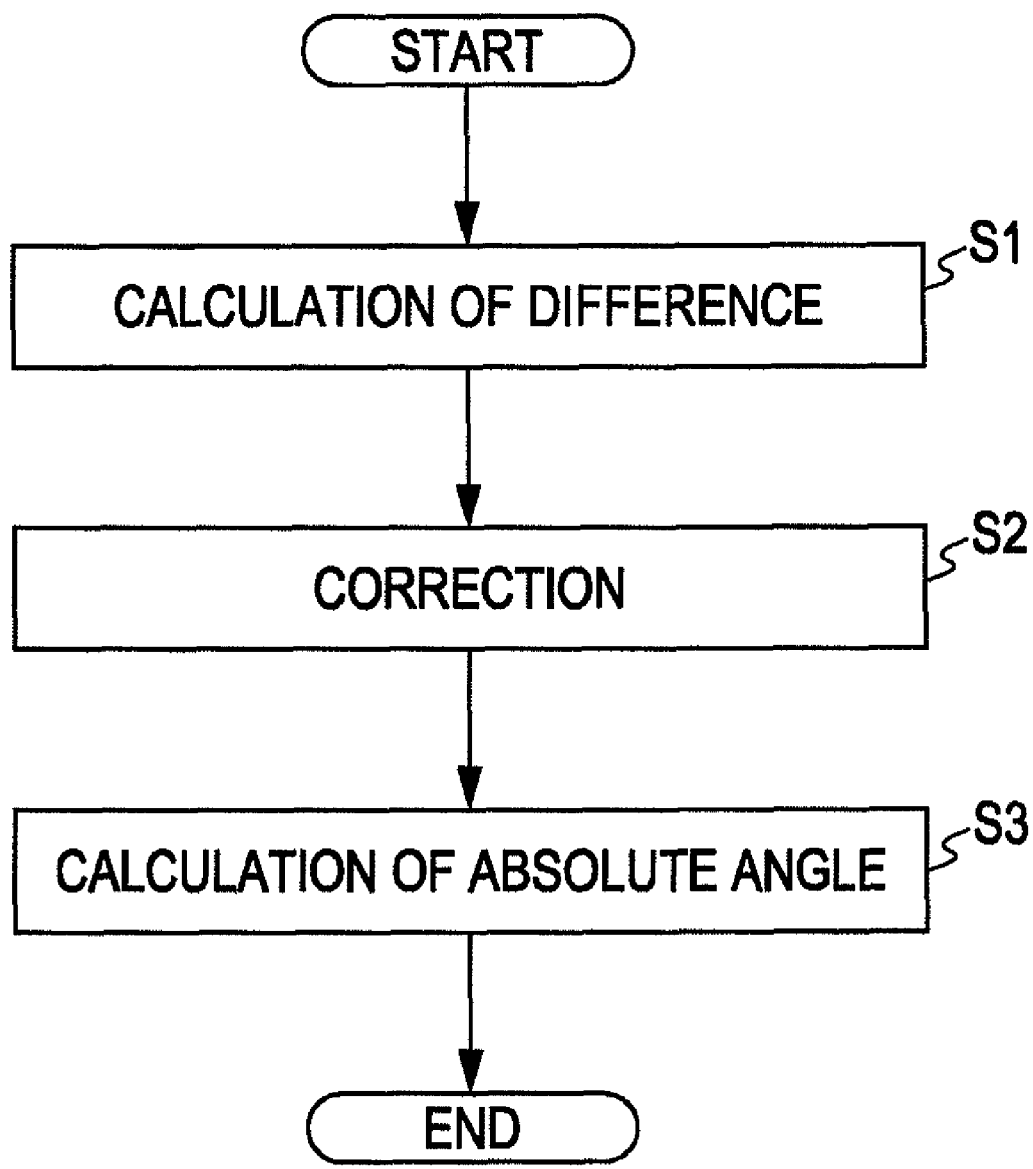
FIG. 9 is a flowchart representing a process for detecting a rotating angle of the multi-rotation angle detection device according to the present invention.

As FIG. 8 illustrates, the multi-rotation angle detection device according to another modified example includes the first driven gear 13 and the second driven gear 14 at the upper surface side of the flanged gear forming section 1a integrally formed with the rotor 1. In the modified example, the first gear 11 and the second gear 12 are formed at the upper surface side of the gear forming section 1a. In this case, the housing 2 has substantially L-like side configuration at the inverted side of the multi-rotation angle detection device of the example as described above. Other features are the same as those of the multi-rotation angle detection device of the example. The corresponding elements are designated with the same codes, and explanation thereof will be omitted.

The process for detecting the rotating angle, which is executed by the above-structured multi-rotation angle detection device will be described.

Figure 10A:
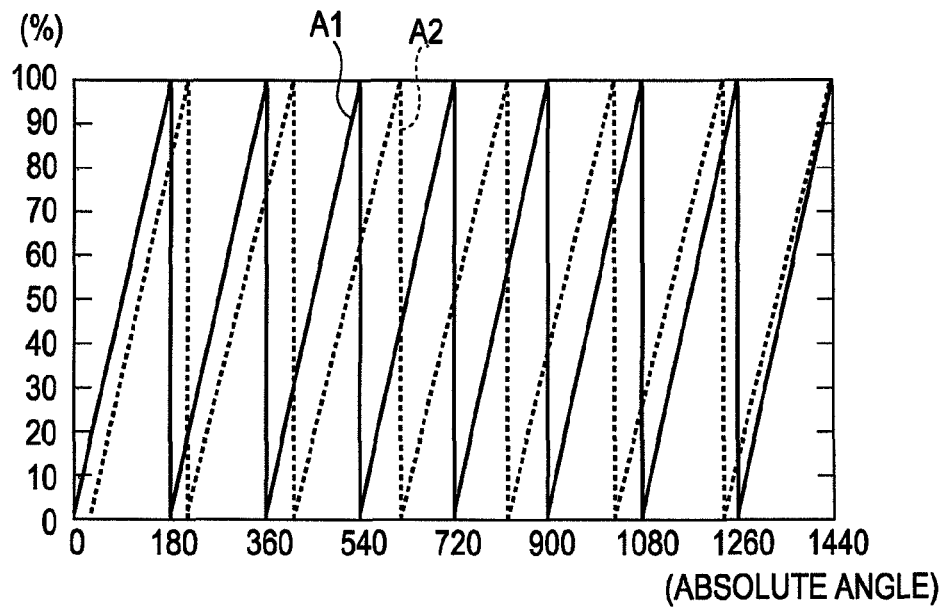
FIGS. 10A to 10C are graphs each representing a relationship between an absolute angle of the rotor of the multi-rotation angle detection device and an angular signal output from a magnetic detection element.

Referring to FIG. 10A, the microprocessor 23 calculates a first angle signal A1 having the output value linearly changed from 0% to 100% while the first driven gear 13 is rotating at the angle from 0° to 360°, and a second angle signal A2 having the output value linearly changed from 0% to 100% while the second driven gear 14 is rotating at the angle from 0° to 360° based on output signals from the first magnetic detection element 20 and the second magnetic detection element 21. When each of the first driven gear 13 and the second driven gear 14 makes the second rotation, each output value irregularly returns to 0% to linearly increase the value again in association with each rotation of the respective driven gears 13 and 14.

The microprocessor 23 executes the arithmetic process for obtaining the absolute rotating angle of the rotor 1 based on the first angle signal A1 and the second angle signal A2. The arithmetic process includes first step (S1) for obtaining a difference between detected values of the first angle signal A1 and the second angle signal A2, second step (S2) for correcting the difference, and third step (S3) for calculating the absolute angle of the rotor 1.

Figure 10B:
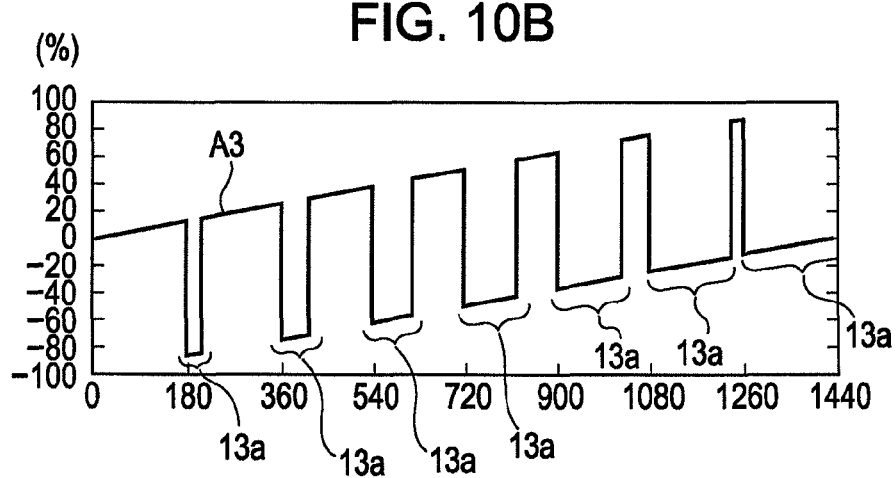

As the first driven gear 13 and the second driven gear 14 rotate at different rotating speeds with respect to the rotation of the rotor 1, the values of rotating angles become different, resulting in the difference between the first angle signal A1 and the second angle signal A2. In first step (S1), as shown in FIG. 10B, the output value of the second angle signal A2 is subtracted from the output value of the first angle signal A1 to obtain a difference signal A3. The difference signal A3 takes a different value depending on the absolute angle of the rotor 1. When the rotor 1 makes four rotations, the difference in the rotating angle between the first driven gear 13 and the second driven gear 14 corresponds to the single rotation, and then, the difference signal A3 becomes 0 again.

Figure 10C:
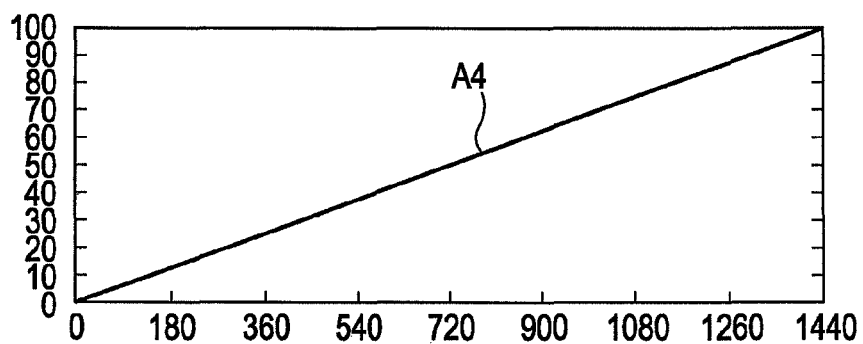

In second step (S2), when the difference signal A3 indicates the negative value, 100 is added to the difference value to calculate a correction signal A4 as shown in FIG. 10C. The correction signal A4 corresponds to the absolute angle to be detected one-on-one over the entire range. As a result, the value linearly changes from 0% to 100%.

In third step (S3), the absolute angle of the rotor 1 which makes more than one rotation, that is, the rotating body is detected based on the correction signal A4.

The method of detecting the rotating angle in case of using the multi-rotation angle detection device of the embodiment for detecting the rotating angle of the automotive steering shaft will be described.

When the driver operates a steering wheel of the automobile, the rotor 1 is rotated together with the steering wheel. Then the first driven gear 13 rotates via the first gear 11 and the second driven gear 14 rotates via the second gear 12.

Assuming that the gear ratio between the first gear 11 and the first driven gear 13 is set to the value "2", the first driven gear 13 will make one rotation for each rotation of the rotor 1 at 180°. The first angle signal A1 during the aforementioned period is expressed as a triangular wave which changes from 0% to 100%. The first driven gear 13 makes eight rotations while the rotor 1 is making four rotations to change the absolute angle from 0° to 1440°. Accordingly, the resultant triangular wave forms eight cycles as shown in FIG. 10A. Assuming that the gear ratio between the second gear 12 and the second driven gear 14 is set to the value "1.75", the second driven gear 14 will make seven rotations while the rotor 1 is making 4 rotations. Accordingly, the second angle signal A2 expressed as the triangular wave forms seven cycles as a whole as shown in FIG. 10A.

In first step (S1) where the first angle signal A1 and the second angle signal A2 are processed, the difference signal A3 as the output difference between the first angle signal A1 and the second angle signal A1 is calculated as shown in FIG. 10B. As the difference signal A3 includes the negative range, the calculated value is corrected in second step (S2) to calculate the correction signal A4 as shown in FIG. 10C. Then in third step (S3), the absolute angle of the rotor 1 which makes more than one rotation, that is, the rotating body is detected based on the correction signal A4.

The multi-rotation angle detection device according to the example and the modified examples is structured to arrange the first and the second driven gears 13, 14 while having the first and the second rotating axes X1-X1 and X2-X2 thereof orthogonalized with respect to the plane which includes the rotating axis Y-Y of the rotor 1. The magnet mount surfaces 13a and 14a of the first and the second driven gears 13 and 14 may be arranged parallel to the plane which includes the rotating axis Y-Y of the rotor 1 so as to reduce the plane size of the multi-rotation angle detection device. As the rotor 1 rotates, the first driven gear 13 and the second driven gear 14 are driven and rotated such that each rotating operation of the respective driven gears 13, 14 is detected by the first and the second magnetic detection elements 20, 21, respectively. In the case where any one of teeth of the first gear 11 and the first driven gear 13, or any one of teeth of the second gear 12 and the second driven gear 14 is broken or lost, the detection signal from the first magnetic detection element 20 corresponding to the first driven gear 13 is compared with the detection signal from the second magnetic detection element 21 corresponding to the second driven gear 14 for detecting the failure, resulting in excellent reliability and fail-safe property.

The present invention is not limited to the aforementioned embodiment, but may be changed into various forms without departing from the scope of the present invention. For example, the multi-rotation angle detection device as the example is employed for the automobile. However, it is not limited to the use for the automobile but may be applied to other types of vehicle such as train and boat. In the respective examples, the gear ratio between the first gear 11 and the first driven gear 13 is set to the value "2", and the gear ratio between the second gear 12 an the second driven gear 14 is set to the value "1.75". However, those ratios may be set to the other values.

The present invention is applicable for detecting the rotating angle of the steering shaft in the automobile.

What is claimed is:

1. A multi-rotation angle detection device comprising:
    a rotor having a first gear and a second gear each with a different number of teeth, which are concentrically provided for a flanged gear forming section;
    a first driven gear having a first rotating axis orthogonalized to a plane including a rotating axis of the rotor, and engaged with the first gear;
    a second driven gear having a second rotating axis orthogonalized to the plane, and engaged with the second gear;
    a first magnet attached to the first driven gear;
    a second magnet attached to the second driven gear;
    a circuit substrate having the first driven gear and the second driven gear;
    a first magnetic detection element disposed at a position opposited the first magnet above the circuit substrate;
    a second magnetic detection element disposed at a position opposited the second magnet above the circuit substrate; and
    a housing storing the rotor, the first driven gear, the second driven gear, the first magnet, the second magnet, the circuit substrate, the first magnetic detection element, and the second magnetic detection element.

2. The multi-rotation angle detection device according to claim 1, wherein the first gear and the second gear disposed at a lower surface side of the circuit substrate.

* * * * *